Figure 10:
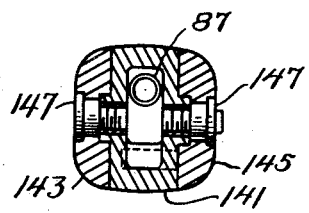

Jan. 6, 1942.  L. E. ASKE  2,268,633
COFFEE MAKER
Filed March 22, 1941  4 Sheets-Sheet 1
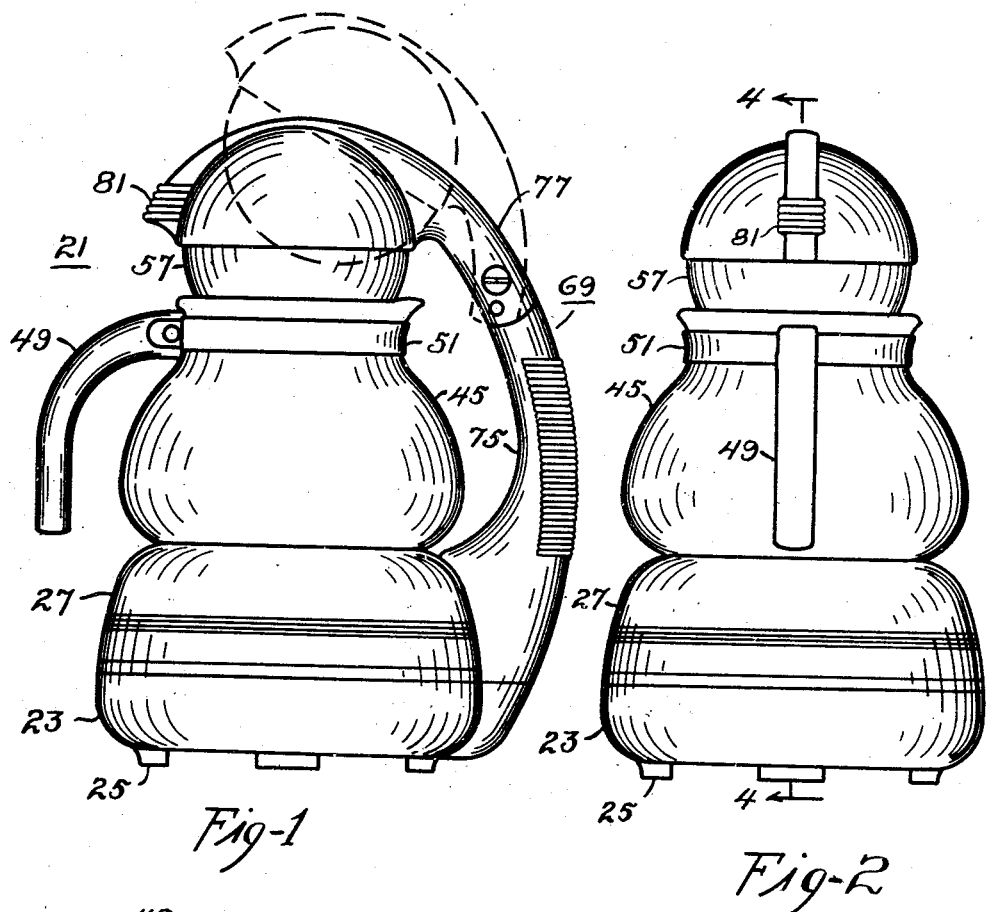
Fig-1
Fig-2
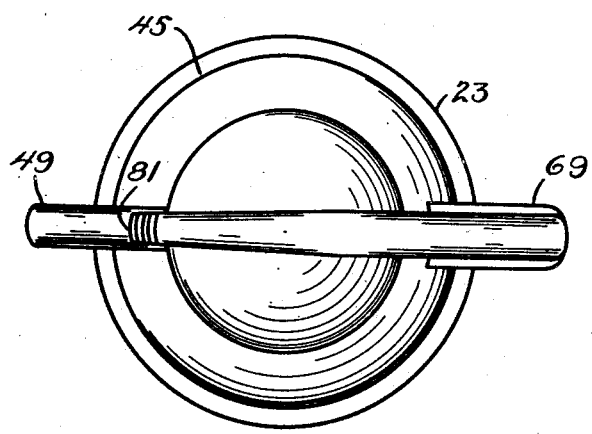
Fig-3
INVENTOR
LEONARD E. ASKE
BY
ATTORNEY

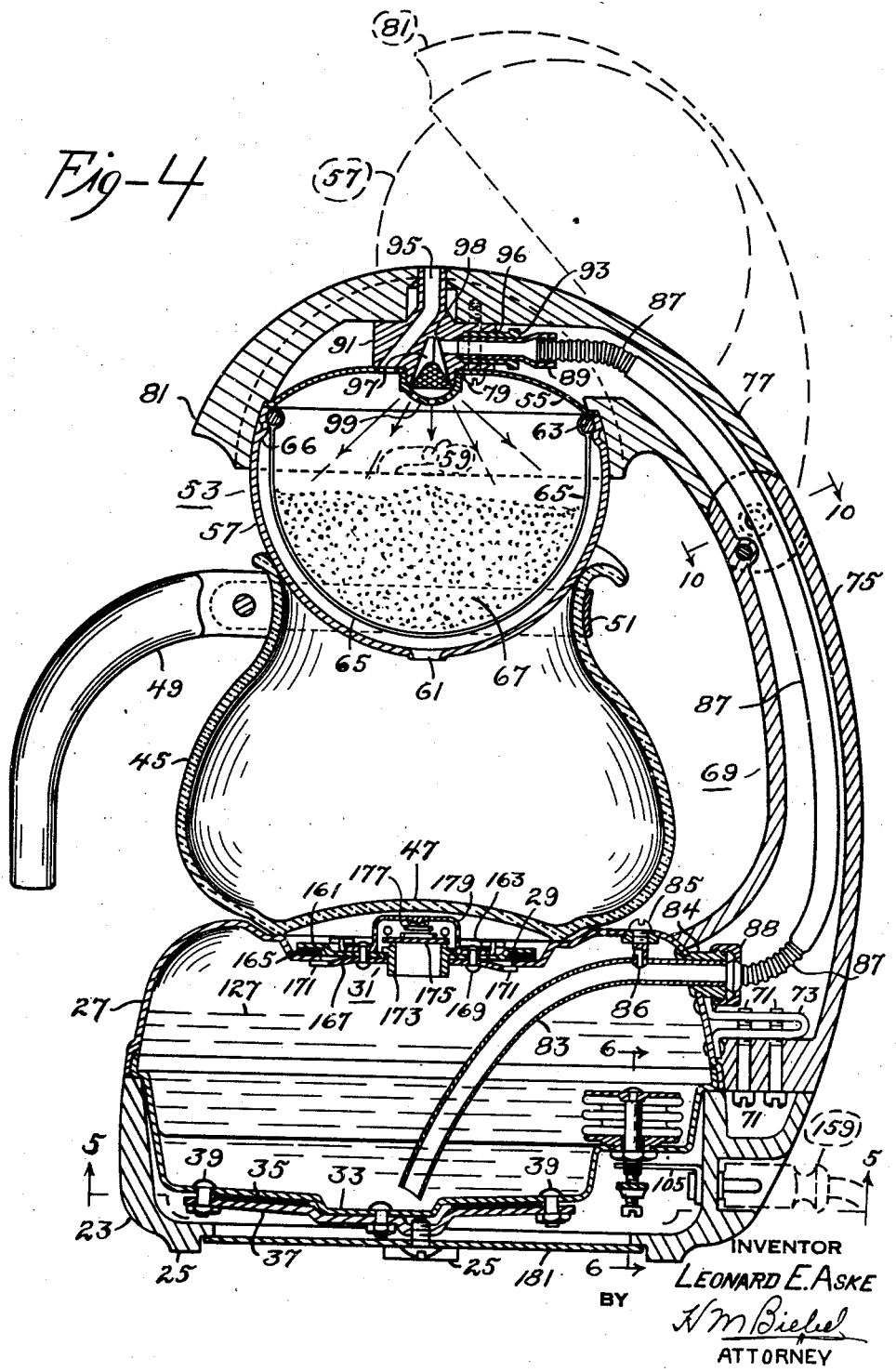

Jan. 6, 1942.    L. E. ASKE    2,268,633
COFFEE MAKER
Filed March 22, 1941    4 Sheets-Sheet 3
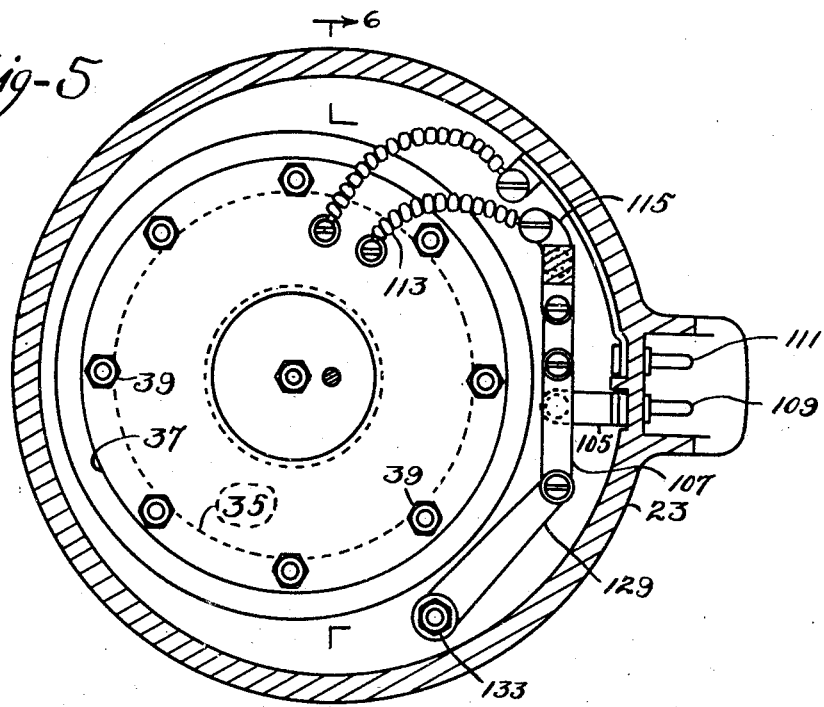
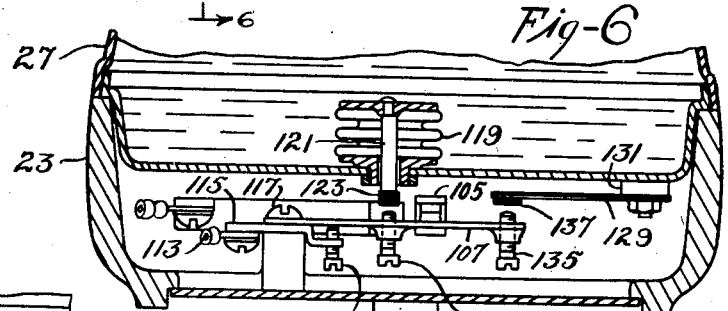
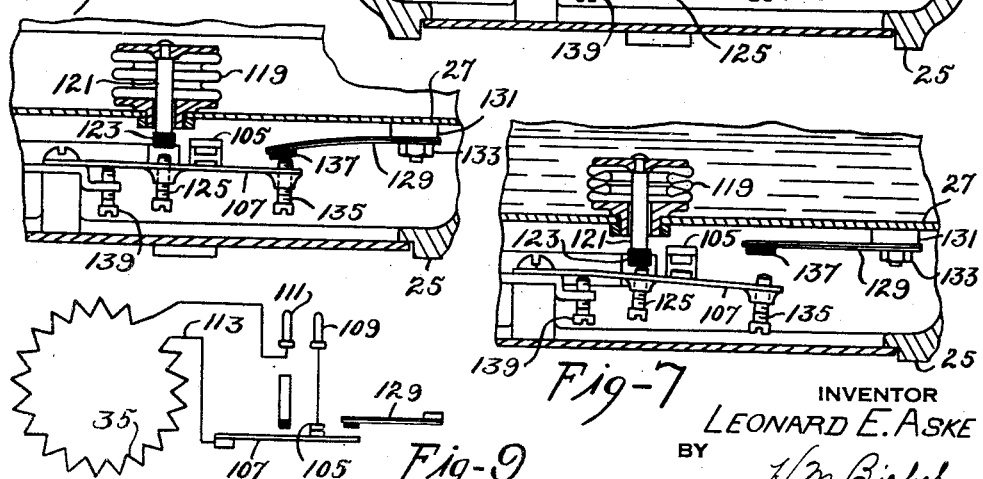
INVENTOR
LEONARD E. ASKE
BY
*H. M. Bielel*
ATTORNEY Jan. 6, 1942.   L. E. ASKE   2,268,633
COFFEE MAKER
Filed March 22, 1941   4 Sheets-Sheet 4

INVENTOR
LEONARD E. ASKE
BY
H. M. Biebel
ATTORNEY

Patented Jan. 6, 1942

2,268,633

UNITED STATES PATENT OFFICE 2,268,633

COFFEE MAKER

Leonard E. Aske, Elgin, Ill., assignor to McGraw Electric Company, Elgin, Ill., a corporation of Delaware Application March 22, 1941, Serial No. 384,669

9 Claims. (Cl. 219—43)

My invention relates to electrically heated appliances and particularly to electric coffee makers.

One of the objects of my invention is to provide a relatively simple and novel form of drip type coffee maker.

Another object of my invention is to provide an electrically heated coffee maker in which hot water is conducted through a substantially vertically extending tube onto the coffee grounds in separate small quantities.

Another object of my invention is to provide a novel form of electrically heated coffee maker having a single carrying handle, which is effective to support the coffee grounds basket.

Another object of my invention is to provide a coffee maker from which the coffee brew container can be quickly removed to be carried to where the coffee is to be served.

Other objects of my invention will either be apparent from a description of one form of device now preferred by me or will be pointed out during the course of such description and set forth in the appended claims.

In the drawings,

Figure 1 is a view, in side elevation, of my improved coffee maker, shown on a reduced scale, Fig. 2 is a view in front elevation of my coffee maker shown on a reduced scale, Fig. 3 is a top plan view of the device shown in Fig. 1, also on a reduced scale, Fig. 4 is a vertical sectional view taken on the line 4—4 of Fig. 2 on a larger scale, parts of the device being shown in the positions they will occupy when the coffee maker is cold or has just been connected to start a coffee making operation, Fig. 5 is a horizontal sectional view taken on the line 5—5 of Fig. 4.

Fig. 6 is a vertical fragmentary sectional view taken on the line 6—6 of Fig. 4 and on the line 6—6 of Fig. 5 showing the control parts when cold or just at the start of a brewing cycle, Fig. 7 is a fragmentary view similar to Fig. 6 but with the parts shown in the positions they will occupy when the coffee maker has been heated and a pressure has been developed in the water container, Fig. 8 is a fragmentary view similar to Fig. 7 but showing the parts in the positions they will occupy when all of the water has been forced out of the water container and the thermal control means is effective.

Figures 11, 12:
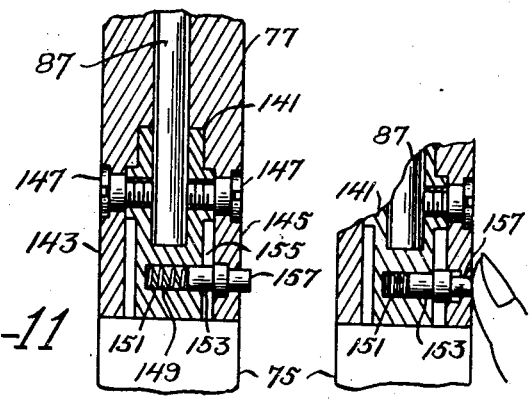
Figure 13:
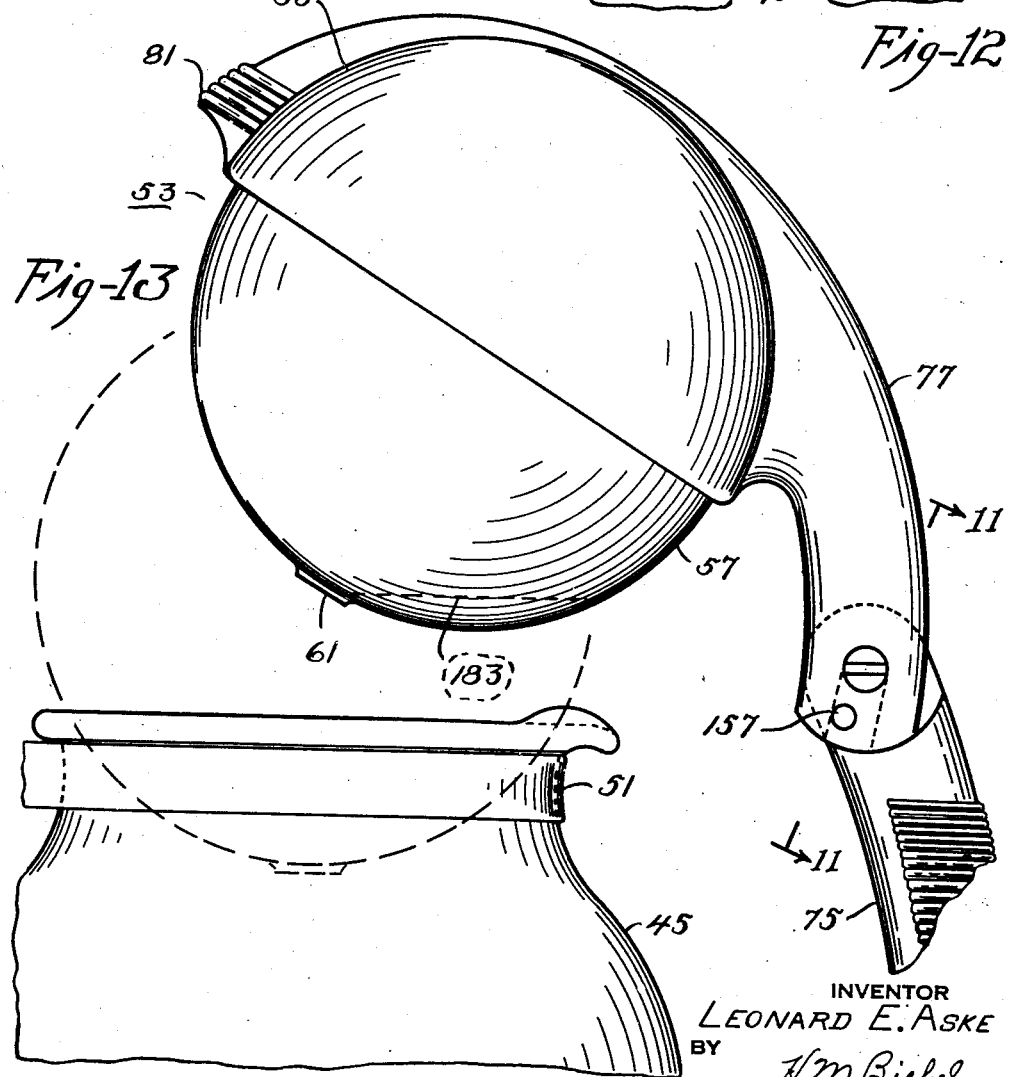

Fig. 9 is a diagram of the electrical connections used in my improved coffee maker, Fig. 10 is a fragmentary sectional view taken on the line 10—10 of Fig. 4, Fig. 11 is a longitudinal section taken on the line 11—11 of Fig. 13 showing the coffee grounds container in raised position, Fig. 12 is a fragmentary view showing a part of Fig. 11 with the locking plunger being manually released, and, Fig. 13 is a fragmentary view in side elevation showing the brew container and the coffee grounds container in raised position thereabove.

Referring first to Figs. 1, 2 and 3 inclusive, I have there shown a coffee maker designated by numeral 21 as including a support 23 which may be made of a suitable moulded composition material and which is generally of annular shape circular in horizontal section. Member 23 is provided with depending legs 25 whereby to raise it slightly above a table top or other surface on which it may be placed during the brewing cycle.

I provide a water container 27, preferably but not necessarily of metal, which is also circular and which has a relatively flat upper surface provided with an opening 29 therein into which opening is fitted a plug 31 easily and quickly removable to permit of filling the water container with the desired quantity of water preparatory to the brewing of coffee. The bottom wall of the water container is provided with a relatively small central depressed portion 33 for a purpose to be referred to in greater detail hereinafter.

A flat annular heating element 35 which may be of any suitable or desired kind and is here shown as including inner and outer layers of thin electric-insulating material such as mica, with a resistor therebetween and a clamping plate 37 on the under side thereof whereby the heating element is clamped against the flat bottom surface of the container 27. It will be noted that the heating element is so designed, constructed and positioned relatively to the water container that it will have a relatively large area of heat-flow path to the water container and I may here note that I prefer to use an electric heating element of relatively large wattage and in samples which have thus far been constructed by me, I have used heating elements of up to 1000 watts capacity whereby a relatively quick heating-up of the water container and of its contents is effected whereby the length of a brewing cycle is appreciably reduced.

I provide a brew container 45 preferably made of vitreous material such as glass, the bottom portion thereof being provided with a centrally raised bottom portion 47. The brew container 45 may be provided with a handle 49 secured in any suitable or desired manner to the brew container as by an annular clamping band 51.

I provide further a coffee grounds container 53 which consists of two parts, first a fixedly supported part 55 which I have shown as being generally of saucer shape having a central flat upper surface whereby it can be secured to a movable support, as will be hereinafter described. The coffee grounds basket includes further a lower spherical portion 57 which interfits with the upper portion 55 to provide a pleasing appearance and is held thereby by means of a pin and socket connection indicated generally by numeral 59 in Fig. 4 of the drawings. I have found this bayonet joint holding means effective and relatively simple but I do not desire to be limited thereto since any other holding and locking means effective for the desired purpose may be used. The part 57 of the coffee grounds basket is provided with a single, relatively large opening 61 at its lowermost portion, the rest of the wall of member 57 being solid.

I provide a filter in the member 57 which may comprise an annular wire or band 63 having suspended therefrom a piece of suitable cloth 65 adapted to receive the coffee grounds indicated by numeral 67 in Fig. 4 of the drawings. The upper portion of member 57 is provided with an inner annular bead 66 to support the ring 63. I wish to point out that the filter 65 is relatively large so that ordinary cloth material can be used for filter purposes even when the coffee grounds in the filter bag have been ground very fine.

Means for supporting the coffee grounds basket 53 above and normally partially interfitting with the brew container 45 may include a handle 69 which, as shown in Fig. 4 of the drawings, may be held in its desired and proper operative position by a pair of screws 71 extending through a lower end portion of handle 69 into a bracket 73 of substantially U-shape having the ends of the arms thereof suitably secured to the wall of the upper part of the water container 27. I do not desire, however, to be limited to this particular means for securing the handle 69 in its proper operative position and may use any other construction effective for the same general purpose. The hollow handle 69 includes a lower portion 75 and an upper portion 77 which are pivotally connected to each other at a point substantially near the upper end of the brew container when the latter is resting upon the water container and the construction and operation of the hinge means will be described in detail later on.

The upper end of the upper portion 77 is provided on its under side with a recess complementary to the element 55 of the coffee grounds basket and a plurality of screws 79 may extend through the upper flattened portion of element 55 and into the handle portion 77 to secure the coffee grounds basket to the handle portion 77. The handle portion 77 may be provided at its extreme upper end with an actuating portion 81 so that the portion 77 may be tilted relatively to the portion 75 for reasons to be hereinafter referred to.

To conduct hot water from the water container 27 upwardly and into the coffee grounds basket, during a brewing cycle, I provide a tube 83 in the container, of generally arcuate shape, the lower end of which extends into the depression 33 hereinbefore described, and the upper end of which passes through a bushing 84 in the wall of the upper portion of the water container. I provide a relief opening in the tube 83 at or near to its highest point and in order to permit of checking this opening I now provide a larger opening in tube 83, and insert a small headed stud 85 through the water container 27 to extend into the tube 83 through said larger opening, the lower end of the stud 85 fitting closely in said larger opening. A small orifice 86 is provided in the body of stud 85 of substantially L-shape and this inlet orifice may be on the order of .040 inch in diameter. The upper end of the stud may be screw threaded and fit into a washer or bushing, to permit of quick and easy removal for inspection purposes.

I provide further an additional flexible tube 87 located within the hollow handle 69 and this may be made of metal so designed and constructed as to provide a fluid-tight flexible tube which has a relatively restricted cross-sectional area, this area being less than the area of the tube 83, for a purpose to be hereinafter described. The lower end of tube 87 is provided with an end portion of enlarged diameter which can be pressed against the bushing 84 by a screw cap 88, in a manner well known in the art. The upper end of the tube 87 may be soldered or brazed into a short pipe 89 fitting into a spray head 91 against which member 55 is held by the screws 79. A tightening bushing 93 around pipe 89 has screw threaded engagement with the spray head 91 to hold the member 89 in the spray head.

The spray head 91 is provided with an exhaust or vent opening 95 which, as shown in Fig. 4 of the drawings, may be of substantially L-shape and which will permit any excess vapor or steam entering the coffee grounds basket to flow outwardly thereof. The short pipe 89 is fitted into a substantially horizontal opening 96 in the spray head 91, which opening communicates with a substantially vertical opening 97 in which a sieve 98 may be located. The perforated arcuate central portion 99 of element 55 may be used to support the sieve in the opening 97 and constitutes a spray.

The spray 99 is provided with a plurality of small openings therein and is so shaped that water flowing upwardly through the tube 87, through the short pipe 89 and the passages 96 and 97 will flow outwardly through these openings and be directed over substantially the entire upper surface of the coffee grounds 67 thereby preventing localized streams of water flowing through the coffee grounds and not obtaining the benefit of all of the coffee grounds placed in the basket which would otherwise occur if no suitably constructed spray were provided.

Means for controlling the energization of the heating element 35 includes a pair of contact bars 105 and 107 normally yieldingly biased into engagement with each other or normally biased toward each other so that suitable contact members secured thereto may be in engagement with each other. The contact bar 105 is stationary, supported by member 23 and connected to a contact pin 109 as shown in Fig. 5 of the drawings. It may be here noted that the second contact pin 111 is suitably connected to one terminal of the heating element 35. The other terminal of the heating element 35 is connected by a short lead 113 to the fixed end of contact bar 107 or more particularly to a bracket 115 to which one end of the movable contact bar 107 may be secured by a screw 117 (see Fig. 6).

I provide a pressure responsive member 119 positioned within the water container 27 and connected therewith in a fluid-tight manner as by mounting it on a horizontally extending portion of the lower part of the water container with an actuating pin 121 secured thereto and extending through an opening in the supporting structure of the bellows 119 so that increases of pressure in the water container during operation thereof will cause the pin 121 to move downwardly, as seen in Figs. 6, 7 and 8 of the drawings. I provide a button 123 on the lower end of pin 121 which button is adapted to engage the upper end of an adjusting screw 125 which latter is mounted on the resilient movable contact arm 107 intermediate the ends thereof as shown, for instance, in Figs. 6, 7 and 8. It is evident that upon an increase of pressure in the water container 27 when partly filled with water to the line 127 (see Fig. 4), the resilient bellows 119 will be compressed with attendant downward movement of the pin 121 and possible engagement thereof with the adjusting screw 125 and upon sufficient increase of pressure in the water container, the contact bars 105 and 107 will be moved out of engagement with each other whereby to deenergize the heating element.

I provide further temperature responsive means for energizing the single control switch and the heating element including a bimetal bar 129 having one end thereof fixedly supported as by a lug or button 131 secured to the bottom surface of the water container so that the bimetal bar 129 will be mounted in a manner to receive heat from the water container 27 it being noted that the fixed support for the bimetal member is positioned relatively close to the heating element 35. I may provide a lock nut 133 to hold the bimetal in its proper operative position. I provide a second adjusting screw 135 on the resilient movable contact bar 107, this adjusting screw being positioned near the outer movable end of bar 107. A lug 137 may be provided on the outer free end of bimetal bar 129 which lug is adapted to engage the adjusting screw 135 so that upon sufficient temperature increase of the bimetal bar 129 it will flex sufficiently to move contact bar 107 out of engagement with contact bar 105, as will be hereinafter described in detail. I provide further an adjusting screw 139 carried by bracket member 115 and engaging contact bar 107 near its fixedly supported end whereby I can effect the desired adjustment of the contact bar 107 as I find it very desirable to bias it normally into engagement with the contact bar 105 with a predetermined pressure in order to obtain the desired operation of my improved coffee maker.

It will be noted from Fig. 4 of the drawings that normally the coffee grounds basket 53 interfits with the upper open end of the brew container 45 in order to ensure that any water flowing or trickling through the coffee grounds 67 will enter the brew container and further that undesired outflow of vapor from the brew will be prevented and in order to easily and quickly remove the brew container from its normal operative position as shown in Fig. 4 of the drawings, it is necessary that the coffee grounds container be moved upwardly to substantially the position shown in the broken lines in Fig. 4 of the drawings. The hinge structure which I employ to support the upper handle portion 77 on the lower handle portion 75 is shown more particularly in Figs. 10 to 13 inclusive and it will be noted that the upper end of the lower handle portion 75 is provided with a portion 141 of reduced width. The lower end of the upper handle portion 77 is provided with a central longitudinal slot therein whereby two longitudinal tongues 143 and 145 are formed the general shape of the interfitting parts being complementary to each other to provide a pleasing appearance. I provide a pair of pivot pins 147 having screw threaded engagement with the portion 141 as shown in Figs. 10 and 11. The inner end of each of the pivot screws 147 is of reduced diameter and of sufficient length to extend into the walls of the portion 141 which, it will be noted, is hollow to receive the tube 87. It will be further noted that the shape of the lower end of the respective tongues 143 and 145 and the shape of the portions of the handle member 75 at each side of the central tongue 141 are complementary and of such shape that when the portion 77 is in the position shown in full lines in Fig. 4, the handle portion 77 will be held in its proper operative position whereby no weight of the coffee basket need be taken by the upper end of the brew container 45.

When it is desired to raise the coffee grounds basket 53 to the position shown in Fig. 13 of the drawings so that the lower end of the coffee container will be above the brew container 45, it is only necessary to grasp the part 81 of handle 77 and move it in a generally upward direction where it will be held by means provided in the cooperating elements 141 and 143 and 145. A lateral opening 149 is provided in member 141 near its lower end and a short compression spring 151 is located in the opening 149 and tends to force a small lug 153 outwardly through the open end of the recess 149. The inner wall of tongue 145 normally adjacent lug 153 is solid so that it is possible for an operator to grasp end portion 81 and move it upwardly as desired. At a given point in tongue 145 I provide recess 155 into which lug 153 may enter in part whereby handle portion 77 and the coffee grounds basket 53 will be held in their turned and raised position as long as may be desired. When the operator desires to return handle portion 77 and the coffee grounds basket 53 to their normal operative positions, he need only press a release button 157 inwardly whereby lug 153 is moved inwardly with attendant compression of spring 151 until the head of lug 153 has been moved to the position shown in Fig. 12 of the drawings whereupon arm portion 77 can be turned in a counter-clockwise direction, as seen in Figs. 4 and 13, to its normal operative position ready, if desired, for another operation or for storing until the device is again required.

The operation of my improved coffee maker will now be described. Let it be assumed that a predetermined amount of water has been placed in the water container 27 as by temporary removal of the plug 31 with reinsertion of the plug 31 and a connecting plug 159 has been moved into engagement with the terminal pins 109 and 111 of the electric heating element, energization of the heating element immediately taking place since the normal position of contact arms 105 and 107 is in engagement with each other. The air in the water container above the water level 127 will, of course, be heated as the water is heated and will expand. A small amount of vapor will also be generated in the early part of the heating of the water and both the heated air and the vapor will flow through the opening 86 and then into the tube 83, into the coffee grounds basket and out into the open air through the exhaust conduit 95. At a temperature very close to the boiling point of water, such an amount of steam will be generated as to substantially close the opening 86 insofar as a free outflow or exhaust of the steam is concerned and a pressure will therefore be generated in the water container 27. When this occurs the level of the water will be forced downwardly with resultant entrance of some of the water to the conduit 83, the water entering at the lower end of the conduit and when sufficient water has been forced up into the conduit 83 to reach that portion thereof where the opening 86 is located, the water will substantially completely shut the opening 86 whereby a quick increase of pressure in the water container will occur forcing some water up the tube 87 until the upper end of this column of water in tube 87 reaches conduit portion 97 from whence it is directed into the spray 99.

I have hereinbefore stated that the cross-sectional area of the tube 87 is restricted, that is, it will present a retarding action to the free outflow or upward movement of hot water therein, this, of course, resulting in a momentary increase in the pressure in the water container 27 whereby pressure is applied to the column of water in tube 87 causing it to move relatively quickly through the tube and outwardly through the openings in the spray 99 with the result that substantially uniform distribution of the water through the spray is obtained. This outflow or quick movement of the water in the tube 87 is of course effective to reduce the pressure in the water container and I believe that a small amount of steam in the water container above the water level therein will enter conduit 83 through the opening 86. When it does so the smaller amount of steam in the water container will, of course, also result in a normally decreased pressure in the water container as well as causing a break in the initially solid column of water in the conduit 83 and the tube 87.

I have found that, as hereinbefore noted, there is a very definite relation between the area of the opening 86 and the cross-sectional area of the flexible tube 87 but when properly correlated, I obtain what may be described as cyclic pumping action of my device whereby small masses of hot water are forced upwardly through the tube 87 and outwardly onto the coffee grounds through the spray, there being appreciable time intervals on the order of a second or so between the successive small quantities of water.

I am aware that water conducting tubes extending above a sealed water container will retard the flow of water from the sealed container until it is substantially at or near to the boiling point but all of such devices of which I have any knowledge operate to cause a steady or continuous stream of water to flow through the substantially vertically extending tube. I attribute this constant flow to the fact that the cross-sectional area of the water-conducting tube is relatively large and in contradistinction to this, since I desire to cause the water to flow in separate successive small quantities, the use of an opening 86 of predetermined cross-sectional area in combination with a restricted water-conducting tube gives me the desired result of spaced apart small quantities of hot water, which I have found to be very desirable in obtaining good leaching of the coffee grounds and therefore a very good coffee brew.

I provide a valve for the sealable water container 27 and at present I prefer to provide this in the plug 31. For this purpose I provide the annular plug 31 with an upper disk 161 having a bail 163 pivotally secured thereto. An annular gasket 165 is secured to the underside of the outer peripheral portion of disk 161, which outer portion is bent upwardly relative to the central portion. A lower disk 167 is secured to the upper disk by rivets 169, and has a plurality of outer projections 171 thereon bent angularly relatively to the plane of the disk to ensure a clamping engagement of the gasket 165 with the wall portion of container 27 at the filler opening. The wall surrounding the filler opening is provided with recesses to admit the projections 171 when the plug is placed in operative position. A relief valve in the plug includes a central flanged tubular member 173 resting on disk 161, having a flat plate 175 resting thereon and yieldingly held thereagainst by a spring 177. The disk 161 has a raised central portion 179 against which the upper end of spring 177 may rest. The vertical wall of portion 179 is apertured to permit of escape of vapor or steam should this become necessary.

As has been hereinbefore set forth, the lower end of conduit 83 extends very close to the bottom of a depressed portion 33 so that substantially all of the water originally placed in the water container will be forced upwardly in the manner hereinbefore described and any small quantity of water remaining will very quickly be vaporized and caused to flow upwardly and out through the tube and the spray 99. When this happens there will be no internal pressure in the water container 27 and therefore the pressure responsive element hereinbefore described will no longer be operative to control the energization of the heating element of the water container. The bimetal bar 129 is preferably so adjusted that the average heating element temperature provided when the single heater control switch is actuated by the bimetal element will be appreciably greater than when the single heater control switch was actuated by the pressure responsive means. The water container 27 is so designed and constructed that it can be heated to an appreciably higher temperature when it contains no water, the heat applied thereto being transmitted by its wall or walls to the lower wall of the brew container 45 whereby the contents of the brew container will be maintained at a desired stand-by temperature.

For illustrative purposes it may be noted that the amount of heat provided by the electric heating element when the water container contains water is such as to maintain the water therein at or slightly above the boiling temperature but the average temperature provided by the heating element is substantially greater when the control switch is actuated by the bimetal control member and the amount of heat then supplied to the brew container when substantially filled with brewed coffee will be sufficient to maintain this coffee at substantially 170° F. This has been found to be sufficient to permit of removing the brew container and carrying it to where the coffee is to be poured and it may be noted that the brewed coffee may be maintained at the desired stand-by temperature for an indefinite length of time insofar as the operation of my coffee maker itself is concerned.

I may provide a bottom closure 181 immediately below the extreme lowermost portion of the water container.

It may be pointed out that my improved coffee maker provides a relatively simple, compact, easily constructed and handled device in which the brewing cycle may be conducted at a point away from where the coffee is to be poured and consumed, if desired, it being only necessary for the operator to easily and quickly remove the brew container from the assembly and take it to where the coffee is to be poured. Any dripping from the coffee grounds basket will not affect the supporting surface on which the coffee maker is located since the tilted-back coffee grounds container 57 is imperforate and will hold an appreciable amount of water, as is shown by the broken line 183.

I have found, as hereinbefore noted, that the character or strength of the coffee brew appears to be very high when using a coffee maker of the design and construction shown herein and I attribute this to the fact that the water sprayed upon the coffee grounds is distributed substantially uniformly thereof in a series of small, spaced apart quantities of hot water, the temperature of which is very near to the boiling point.

Various modifications may be made in the system embodying my invention without departing from the spirit and scope thereof and I therefore desire that all such modifications as are clearly covered by the appended claims shall be included as a part of my invention.

I claim as my invention:

1. A coffee maker comprising a sealable water container, a coffee grounds basket, a brew container, a heating means for the water container, means for controlling the energization of the heating means, a tube extending from the inside of the water container for conducting hot water therefrom to the coffee grounds container, said tube including a portion of restricted cross-sectional area and an opening in the wall of said tube inside of the water container of predetermined area relatively to the area of said restricted portion to cause cyclic variation of pressure in said water container and cyclic pumping action on the water to force successive small quantities of hot water through the tube.

2. A coffee maker comprising a sealable water container, a coffee grounds basket above said water container, a brew container supported by and on said water container during operation, an electric heating means for said water container, means for controlling the energization of said heating means to maintain a desired average temperature of the water in the water container, a tube having a portion in the water container, extending outwardly thereof through an opening in the wall of the water container and having a portion of restricted cross-sectional area ending above the coffee grounds basket and an opening in said tube within the water container of predetermined area relatively to the cross-sectional area of said restricted part of the tube to cause a cyclic variation of pressure in said water container to cause hot water to be moved upwardly through said tube and into the coffee grounds basket in a series of spaced small quantities of water when the water has been heated to a given temperature.

3. A coffee maker comprising a sealable water container, an electric heating element for the water container, a brew container removably supported on said water container, a handle at one side of the water container and extending upwardly therefrom, a coffee grounds basket supported by said handle at its upper end above the brew container, a tube having a lower portion in the water container and an upper portion in the handle and extending over the coffee grounds basket, said upper portion having a restricted cross-sectional area and an opening in the wall of said lower portion of the tube above the maximum water level of the water container, the cross-sectional area of said opening having a predetermined ratio to the cross-sectional area of said restricted cross-sectional area of the upper tube portion to cause hot water to flow into said coffee grounds basket in a succession of small separate quantities.

4. A coffee maker comprising a sealable water container, an electric heating element therefor, a switch for said heating element, means to control said switch to maintain the water at substantially a predetermined temperature, a brew container adapted to rest on the water container during operation of the coffee maker, a handle for carrying the coffee maker having its lower end at one side of the water container and extending upwardly therefrom, said handle including an upper end portion hingedly mounted on a lower portion, a coffee grounds basket supported by the upper end of the handle in a position to interfit with the upper end of the brew container and substantially close the latter, a tube having its lower end portion in the water container, its intermediate flexible portion in the handle and its upper end portion over the coffee grounds basket to conduct hot water from the water container to the coffee grounds basket, the upper end portion of the handle being tiltable to move the coffee grounds basket away from the brew container at the end of an operating period to effect removal of the brew container by an operator.

5. A coffee maker comprising a sealable water container, an electric heating element therefor, a single switch for said electric heating element, means for controlling said switch to maintain a predetermined average temperature of the heating element when the water container has water therein, a brew container adapted to rest on the water container, a coffee grounds basket above the brew container, a handle having its lower end fixed relatively to the water container and having the coffee grounds basket supported by the upper end of the handle over the brew container, a tube having its lower end portion in the water container and its upper end portion over the coffee grounds basket to conduct substantially all of the water from the water container to the coffee grounds basket and temperature controlled means controlling said single switch to cause the heating element to maintain a predetermined higher average temperature after all of the water has been conducted out of the water container and entered the brew container to hold the brew in the brew container at a desired standby temperature.

6. A coffee maker comprising a sealable water container, a brew container normally resting on the water container, a coffee grounds basket above the brew container, an electric heating element for the water container, a single switch for said electric heating element, pressure-actuated means in the water container for controlling said switch to maintain a given average temperature of the heating element as long as the water container has water therein, a tube having its lower end portion in the water container and its upper end portion ending over the coffee grounds basket to conduct substantially all of the water from the water container to the coffee grounds basket to cause the water to flow through the coffee grounds basket into the brew container and a thermally-actuable element for controlling said switch to cause it to maintain the electric heating element at a higher average temperature after all of the water has been conducted out of the water container to cause the water container to transmit heat from the heating element to the brew container to maintain the brew therein at a desired stand-by temperature.

7. A coffee maker comprising a sealable water container, a brew container normally resting on the water container, a coffee grounds basket positioned above the brew container, an electric heating element on the water container to heat the same and cause a pressure therein when containing water, a tube having its lower end portion in the water container and its upper end over the coffee grounds basket and adapted to conduct hot water from the water container to the coffee grounds basket, a single switch for said electric heating element, pressure-actuated means in the water container for causing said switch to maintain a predetermined average temperature of the heating element and of the water in the water container and thermally-actuated means for causing said switch to maintain a predetermined higher average temperature of the heating element after all of the water has been conducted out of said water container.

8. A coffee maker comprising a sealable water container, a brew container normally resting thereon, a coffee grounds basket above the brew container, an electric heating element for the water container, a tube having its lower end portion in the water container and having a flexible upper end portion of restricted cross-sectional area, an opening of predetermined size in the tube in the lower end portion thereof, a switch controlling the energization of said heating element, pressure-responsive means for controlling said switch to cause the heating element to heat the water container and any water therein and cause a cyclically varying pressure on the water in the water container and movement of the hot water outwardly through the tube in separated small quantities and temperature-responsive means for controlling said switch to cause the heating element to heat the water container and thereby the brew container resting thereon, said temperature-responsive means causing the heating element to operate at a higher average temperature than does the pressure-responsive means.

9. A coffee maker comprising a support, a sealable metal water container on said support, an electric heating element clamped on said water container, a glass brew container removably positioned above and in engagement with said water container, a coffee grounds basket above the brew container, a handle for carrying the coffee maker extending upwardly from the support at one side of the water container and including an upper end portion pivotally connected to the lower portion, a tube having its lower end portion in the water container, its intermediate portion extending upwardly in the handle and comprising a flexible portion adjacent the pivotal connection of the handle portions and having its upper end portion over the coffee grounds basket, said intermediate portion of the tube having a restricted cross-sectional area and said lower end portion of the tube having an opening in the wall thereof of a predetermined size, a control switch for said electric heating element, pressure-responsive means in said water container operating said control switch to cause the heating element to maintain a small pressure in the water container and force the hot water upwardly through the tube in separate small quantities until all of the hot water has been forced out of the water container and has entered the brew container and a temperature-responsive means operating said control switch to cause the heating element to heat said metal water container and thereby hold the contents of the brew container at a desired stand-by temperature.

LEONARD E. ASKE.